US005647478A

United States Patent [19]

Hirai

[11] Patent Number: 5,647,478

[45] Date of Patent: Jul. 15, 1997

[54] SWITCH ASSEMBLY HAVING A SWITCH CONTACT SECTION INSTALLED BETWEEN A SUBSTRATE AND A LOWER CASE

[75] Inventor: Hideo Hirai, Tokyo, Japan

[73] Assignee: Niles Parts Co., Ltd., Japan

[21] Appl. No.: 575,098

[22] Filed: Dec. 19, 1995

[30] Foreign Application Priority Data

Dec. 20, 1994 [JP] Japan .................................... 6-334838

[51] Int. Cl.[6] .......................................... H02B 1/26

[52] U.S. Cl. ..................... 200/303; 200/332.1; 200/339; 200/292

[58] Field of Search .................................. 200/303, 339, 200/292, 561, 572, 332, 332.1

[56] References Cited

U.S. PATENT DOCUMENTS

| | | | |
|---|---|---|---|
| 5,045,656 | 9/1991 | Kojima | 200/332.1 X |
| 5,285,039 | 2/1994 | Satoh | 200/561 X |
| 5,290,983 | 3/1994 | Roberts et al. | 200/292 X |
| 5,414,231 | 5/1995 | Sato et al. | 200/339 X |

FOREIGN PATENT DOCUMENTS

| | | |
|---|---|---|
| 63-245837 | 10/1988 | Japan . |
| 3-37921 | 2/1991 | Japan . |

*Primary Examiner*—Renee S. Luebke
*Attorney, Agent, or Firm*—Ronald P. Kananen

[57] ABSTRACT

A switch assembly having a switch contact section positioned with high precision by forming positioning portions for the switch contact section on a lower case 28. The lower case 28 is coupled with an upper case 2. Knobs 3, 4, 5, 6, 7 and 8 are pivotally supported on the upper case 2, respectively, and have operation rods **3*b*, 4*c*, 5*c*, 6*c*, 7*c*, 8*a* projected downwardly. The switch contact sections 11, 16, 19, 22, 25 and 26 have operation shafts 11*a*, 16*a*, 19*a*, 22*a*, 25*a* and 26*a* to be contacted with operation rods 3*b*, 4*c*, 6*c*, 7*c* and 8*a*, respectively. The lower case 28 is provided with positioning portions 28*b*, 28*c*, 28*d*, 28*e*, 28*f*, 28*g* and 28*i* for positioning the switch contact sections 11, 16, 19, 22, 25 and 26** at predetermined positions, respectively.

6 Claims, 5 Drawing Sheets

SWITCH ASSEMBLY HAVING A SWITCH CONTACT SECTION INSTALLED BETWEEN A SUBSTRATE AND A LOWER CASE

BACKGROUND OF THE INVENTION

1. Field of the Invention

The present invention relates generally to switches, and in particular, to a switch assembly comprising a switch contact section, which is a small size switch received in a case, installed between a substrate and a lower case. The switch assembly may be used, for example, as a power window switch for automobiles.

2. Description of the Prior Art

A related switch assembly is disclosed in Japanese Utility Model Publication Laid-Open No. 3-37921. The '921 Publication shows a power window switch in which a switch contact section composed of a small size switch with a connecting section is installed within the case of the power window switch, and the switch contact section is welded on the upper surface of a printed substrate fixed on an electrode plate. The connecting section contacts with an operation rod of a knob pivotally supported on the case, thereby performing ON-OFF switching operation.

However, since the switch contact section of the conventional technique is welded on the print substrate, the print substrate is fixed on the electrode plate, and the operation rod of the knob contacts with the connecting section of the switch contact section by coupling the upper case pivotally supporting the operation rod of the knob with the electrode plate. Therefore, there are problems in that the operation rod of the knob and the connecting section are not disposed precisely in a predetermined position because of the error generated when the knob is pivotally supported on the upper case, the error generated when the switch contact section is welded on the print substrate, the error generated when the print substrate is fixed on the electrode plate, and the error generated when the electrode plate is coupled with the upper case.

Moreover, according to the conventional switch assembly, if the operation rod of the knob is undesirably shifted from the connecting section in a contact position, the operation feeling of the knob and a motion of the knob become poor.

Moreover, the conventional power window switch, as shown, for example, in Japanese Patent Publication Laid-Open No. 63245837, has an intermediate case and a substrate mounted in a switch case. Electric parts are attached on the upper and lower surfaces of the intermediate case and the substrate. Therefore, there are problems in that the number of parts and fabrication processes becomes undesirably increased, and the size of the switch becomes undesirably bulky.

SUMMARY OF THE INVENTION

The present invention solves the problems in the above-mentioned prior art. The present invention relates to a switch assembly comprising an upper case, a lower case to be coupled with the upper case, and a knob pivotally supported on the upper case. The assembly has an operation rod extending downwardly from the knob, and a switch contact section having an operation shaft to be contacted with the operation rod of the knob. Since the lower case is provided with positioning sections for positioning the switch contact section at a predetermined position, the positioning of the switch contact parts can be performed with high precision. Moreover, it becomes possible to automatically fabricate each switch contact section and increase the operation feeling of the knob.

It is another object of the present invention to automatically assemble the switches by a structure wherein a substrate is mounted within the box composed of the upper case and the lower case in the horizontal direction, and the substrate is provided with the switch contact sections on the lower surface of the substrate.

It is another object of the present invention to reduce the size, in height, of a switch case and the size of the switch per se as a whole, by a structure wherein the substrate is mounted at the position adjacent to the inner top surface of the upper case, and further provided with through holes or notches for allowing insertion of the operation rod of the knob.

It is yet another object of the present invention to achieve an automatic welding process of all electrical parts mounted on the substrate by a structure wherein the electrical parts are mounted only on the lower surface of the substrate.

BRIEF DESCRIPTION OF THE DRAWINGS

The present invention will become more clearly appreciated as the disclosure of the present invention is made with reference to the accompanying drawings.

In the drawings.

DETAILED DESCRIPTION OF THE PREFERRED EMBODIMENT

Figure 1:
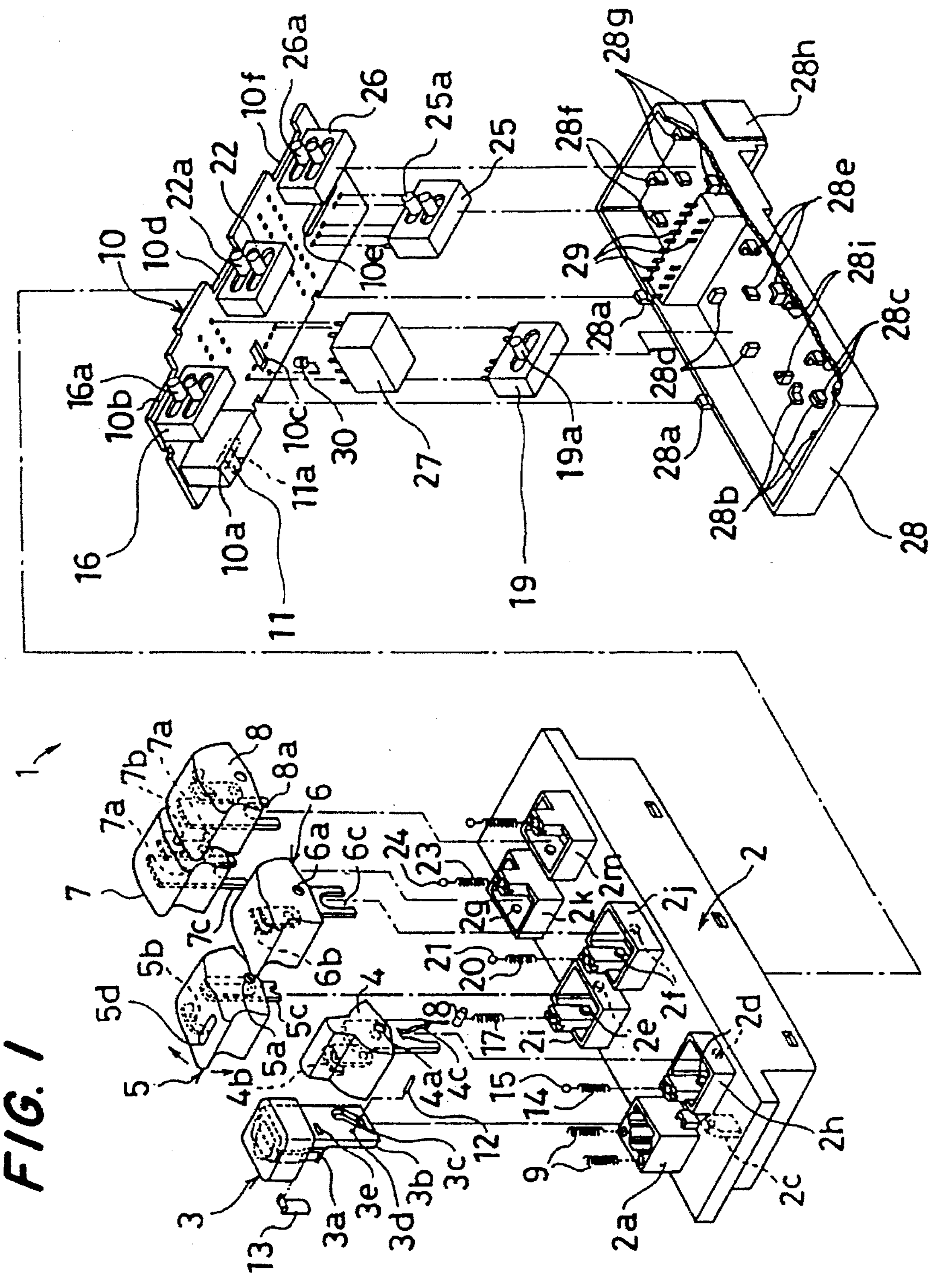
FIG. 1 is an exploded perspective view showing a preferred embodiment of the present invention.

A preferred embodiment of the present invention will be described in detail hereinafter with reference to FIGS. 1 to 5.

Numeral 1 denotes a switch body, such as a power window switch for opening or closing a window of an automobile. The switch body 1 may be disposed, for example, on an arm rest on a door or an inner wall of a door of an automobile. Numeral 2 denotes an upper case having knobs 3, 4, 5, 6, 7 and 8 on the upper surface. The knob 3 is an operation member used for a push lock switch for locking the window glass. The knob 3 is mounted on the upper case 2 to be movable in the vertical direction by a structure such that a claw 3*a* of the knob 3 is contacted to a step portion (not shown) in a mounting portion 2*a* of the upper case 2 through a spring 9. The knob 3 has an operation rod 3*b* projected downwardly and passing through the mounting portion 2*a*.

The operation rod 3*b* is adapted to be movable in the vertical direction and has a slanted hole 3*c* for moving an operation shaft 11*a* of the switch contact section 11 in the horizontal direction. The operation rod 3*b* is inserted through the mounting portion 2*a* and the through hole 10*a* of the substrate 10, and the operation shaft 11*a* is inserted into the slanted hole 3*c*. The operation rod 3*b* has a hole 3*d* in which a lock pin 12 is inserted, which is adapted to contact with pressure to a heart-shaped cam 2*c* formed on the upper case 2. The operation rod 3*b* has a hole 3*e* to which a plate spring 13 is fixed in order to urge a lock pin 12.

The knob 4 is an operation member used as a seesaw switch for locking the door. The knob 4 is mounted on the upper case 2 in freedom of oscillating motion by fitting a supporting shaft 2*d* to a shift hole 4*a*. Numeral 4*b* is a step groove to be pressed by means of a steel ball 15 urged by a spring 14. The knob 4 has an operation rod 4*c* projected downwardly for contacting the operation shaft 16*a* of a switch contact section 16. The operation rod 4*c* has a fork-shaped portion at its lower end which passes through the mounting portion 2*h* and the notch portion 10*b* of the substrate 10 in order to contact with the operation shaft 16*a* of the switch contact section 16.

The knob 5 is an operation member used as a two-stepped seesaw switch for opening or closing the window at the driver's seat side. The knob 5 is mounted on the upper case 2 in freedom-of-oscillating motion by fitting a supporting shaft 2*e* to a shift hole 5*a*. During a first step operation of the knob 5, the window is caused to move in the opening direction or the closing direction. During a second step operation of the knob 5, the window is automatically opened or closed fully. The knob 5 is formed with an operation rod 5*c* adapted to contact the operation shaft 19*a* of the switch contact section 19. At a lower side of the knob 5, there is provided a light emitting element 30 for illuminating a display portion 5*d* disposed at a top portion of the knob 5 for night illumination.

Numeral 5*b* denotes a step groove to be pressed by the column-shaped pin 18 urged by a spring 17. The step groove 5*b* provides a click feeling in the motion between a first operation and a second operation of the knob 5, and makes the knob 5 return to its OFF position automatically. The operation rod 5*c* has a fork-shaped portion at its lower end which passes through the mounting portion 2*i* and the through hole 10*c* of the substrate 10 in order to contact with the operation shaft 19*a* of the switch contact section 19. The display portion 5*d* is illuminated for night illumination by the light emitting element 30 mentioned above.

The knob 6 is an operation member used as an automatically return type seesaw switch for opening or closing the window glass at the assistant driver's seat side. The knob 6 is mounted on the upper case 2 in freedom of oscillating motion by fitting a supporting shaft 2*f* to a shift hole 6*a*. Numeral 6*b* is a step groove to be pressed by means of a steel ball 21 urged by a spring 20. The step groove 6*b* causes an automatic return of the knob 6 to the OFF position thereof. The knob 6 has an operation rod 6*c* projected downwardly for contacting the operation shaft 22*a* of a switch contact section 22. The operation rod 6*c* has a fork-shaped portion at its lower end that passes through the mounting portion 2*j* and the notch portion 10*d* of the substrate 10 in order to contact with the operation shaft 22*a* of the switch contact section 22.

The knob 7 is an operation member used as an automatically return type seesaw switch for opening or closing the window glass at the rear seat side of the driver's seat. The knob 7 is mounted on the upper case 2 in freedom of oscillating motion by fitting a supporting shaft 2*g* to a shift hole 7*a*. Numeral 7*b* is a step groove to be pressed by means of a steel ball 24 urged by a spring 23. The step groove 7*b* causes an automatic return of the knob 7 to the OFF position thereof. The knob 7 has an operation rod 7*c* projected downwardly for contacting a slide shaft 25*a* of a switch contact section 25. The operation rod 7*c* has a fork-shaped portion at its lower end that passes through the mounting portion 2*k* and the through hole 10*e* of the substrate 10 in order to contact with the operation shaft 25*a* of the switch contact section 25.

The knob 8 is an operation member used as an automatically return type seesaw switch for opening or closing the window glass at the rear seat side of the assistant driver's seat. The knob 8 has the same formation and structure as the knob 7, as described above. The knob 8 has an operation rod 8*a* projected downwardly for contacting an operation shaft 26*a* of a switch contact section 26. The operation rod 8*a* has a fork-shaped portion at its lower end that passes through the mounting portion 2*m* and the notch portion 10*f* of the substrate 10 in order to contact with the operation shaft 26*a* of the switch contact section 26.

The substrate 10 is provided with the switch contact sections 11, 16, 19, 22, 25, 26, a relay 27, a lower case 28 and the like on the lower surface. Each terminal 29 and the like is welded only on the upper surface of the substrate 10. The substrate 10 is fixed to the lower case 28 by welding the terminals 29, which are molded integrally with the lower case 28 through an insert molding method.

The switch contact sections 11, 16, 19, 22, 25 and 26 are inserted with pressure into the positioning portions 28*b*, 28*c*, 28*d*, 28*e*, 28*f* and 28*g* formed as projections on the lower case 28, respectively. The terminals of each of the switch contact sections 11, 16, 19, 22, 25 and 26, and the terminals 29 of the lower case 28 are then inserted into the through holes of the substrate 10, respectively, and then are welded with the substrate 10, respectively.

Figure 2:
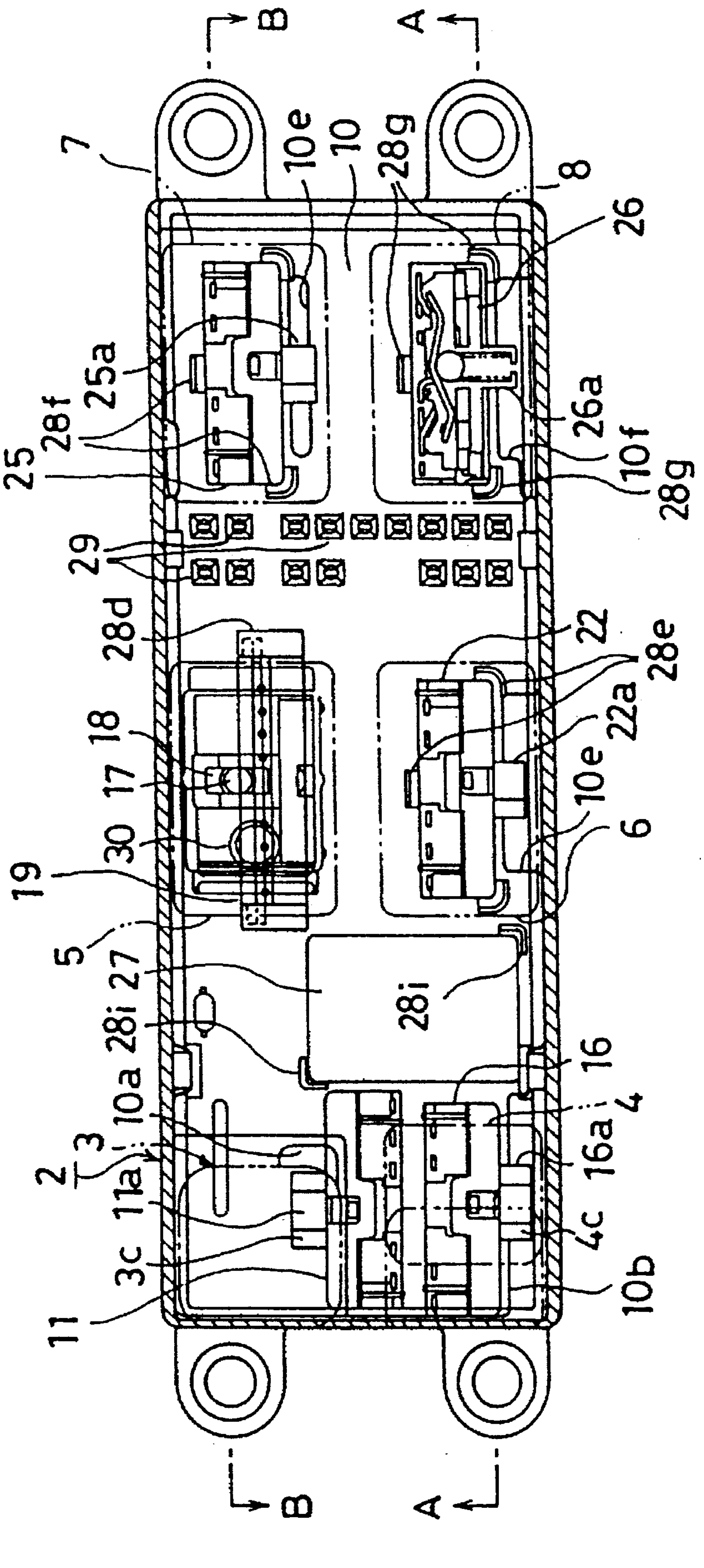
FIG. 2 is a longitudinal sectional view showing the preferred embodiment of the present invention.
Figure 3:
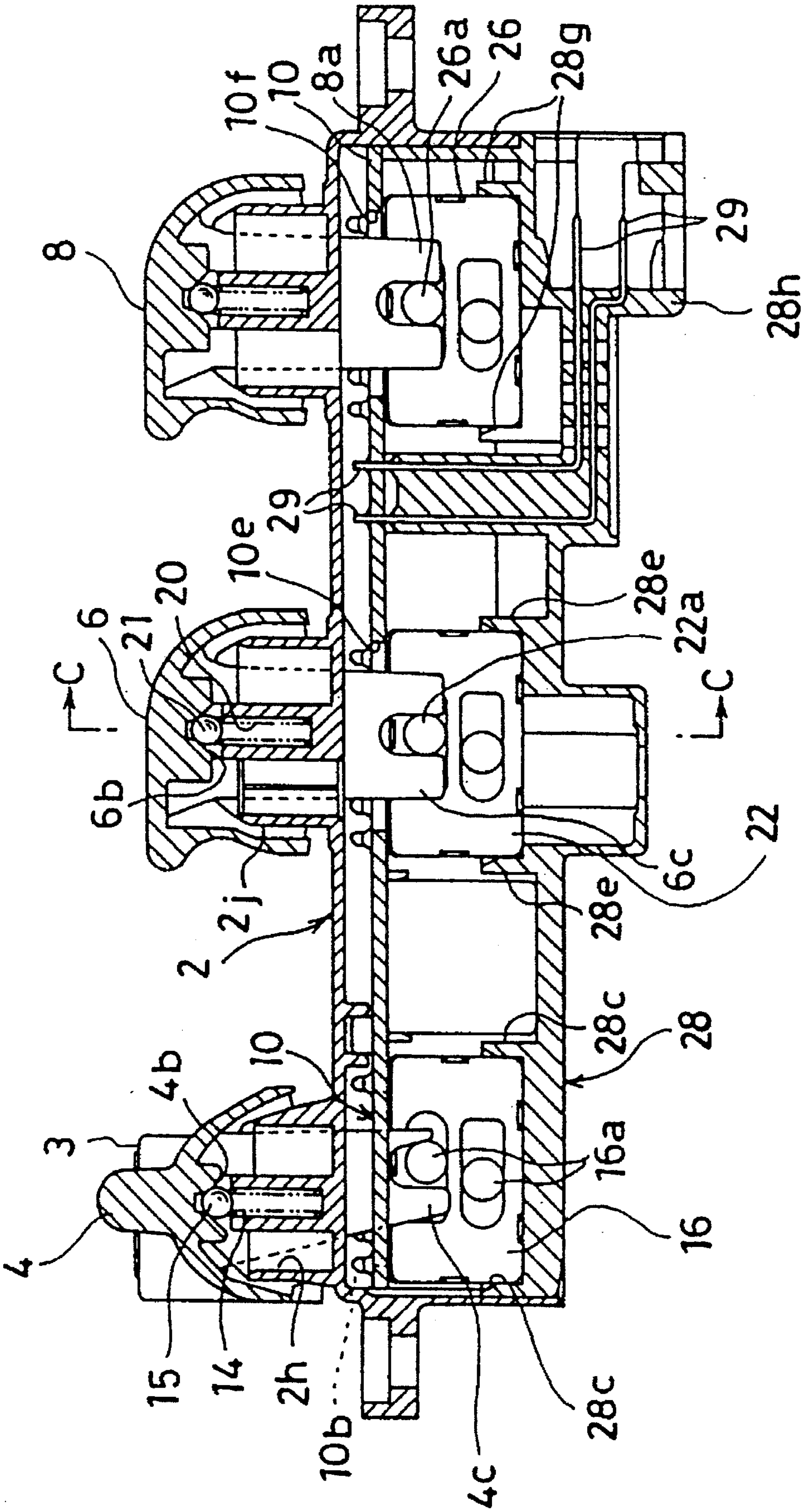
FIG. 3 is a sectional view taken along the line A—A in FIG. 2.
Figure 4:
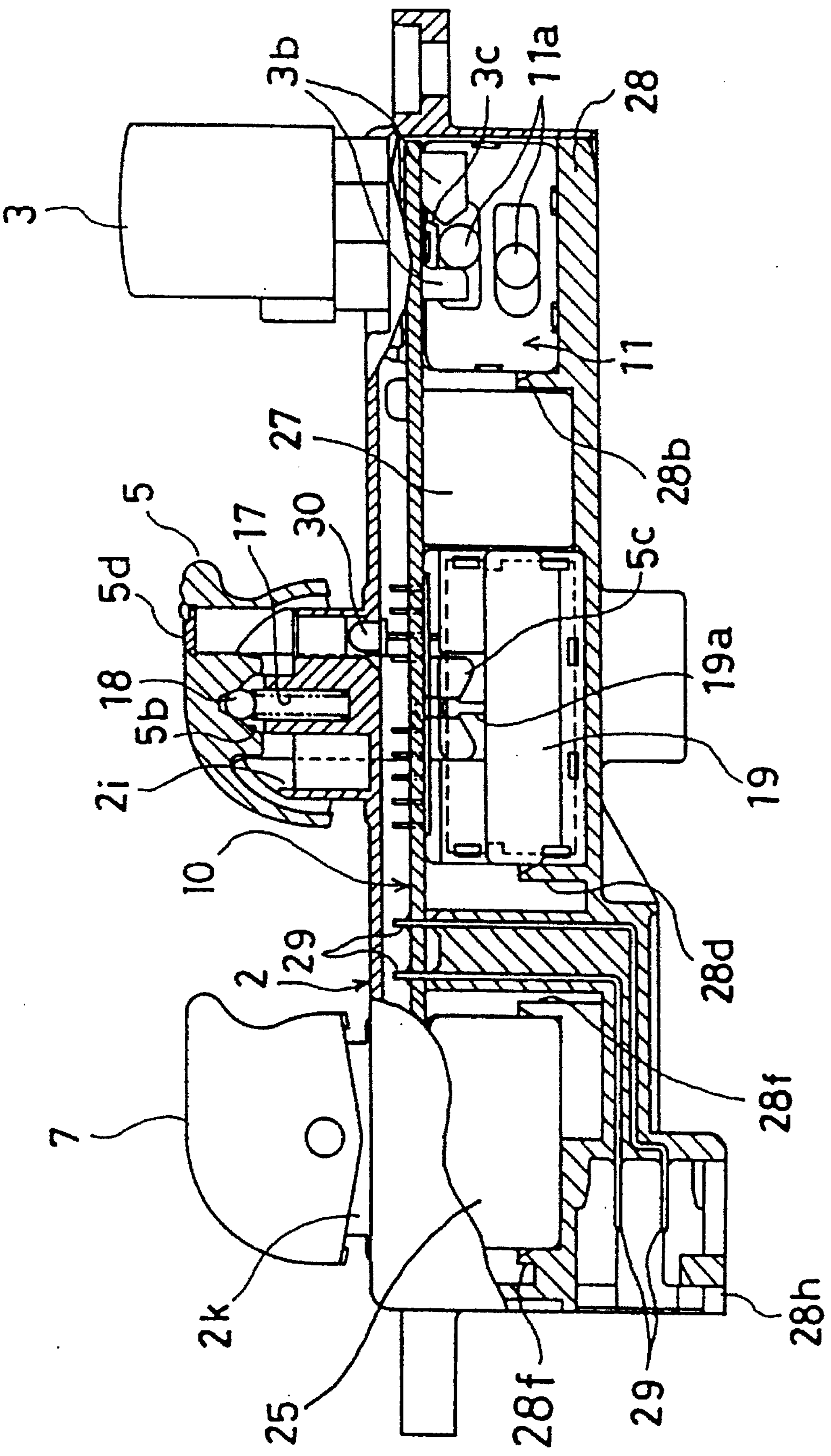
FIG. 4 is a sectional view taken along the line B—B in FIG. 2.

The switch contact sections 11, 16, 19, 22, 25 and 26 may be a small size switch as shown, for example, in Japanese Patent Publication Laid-open No. 3-37921 or Japanese Patent Publication Laid-open No. 63-245837. The switch contact sections 11, 16, 19, 22, 25 and 26 achieve a switching operation by moving one or two operation shafts 11*a*, 16*a*, 19*a*, 22*a*, 25*a* and 26*a* in the horizontal direction along a straight line thereby moving its movable contacts, as shown in FIG. 2.

The electric parts 27 may be a relay composing an electric circuit used for a power window of an automobile, and inserted with pressure into the positioning portion 28*i* of the lower case 28 thereby disposed at a predetermined position on the lower surface of the substrate 10. The lower case 28 is fitted to the lower-side opening portion of the upper case 2, and fixed to the upper case 2 by using claws 28*a* provided on the lower case 28. The lower case 28 is formed integrally with the positioning portions 28*b*, 28*c*, 28*d*, 28*e*, 28*f*, 28*g* and 28*i* for holding or supporting the switch contact sections 11, 16, 19, 22, 25, 26 and the electric parts 27 as projections on the upper surface. The positioning portions 28*b*, 28*c*, 28*d*, 28*e*, 28*f*, 28*g* and 28*i* are projections, respectively, for supporting or holding the periphery of each of the switch contact sections 11, 16, 19, 22, 25, 26 and the electric parts 27.

The positioning portions 28*b*, 28*c*, 28*d*, 28*e*, 28*f*, 28*g* and 28*i* may be any other member with different formation from the above-mentioned ones for the purpose of supporting or holding the switch contact sections 11, 16, 19, 22, 25, 26 and the electric parts 27. For example, the positioning portions 28*b*, 28*c*, 28*d*, 28*e*, 28*f*, 28*g* and 28*i* may be any of slit, hole, cylindrical parts or resilient parts which can fit to the lower surface of the switch contact sections 11, 16, 19, 22,. 25, 26 and the electric parts 27.

Figure 5:
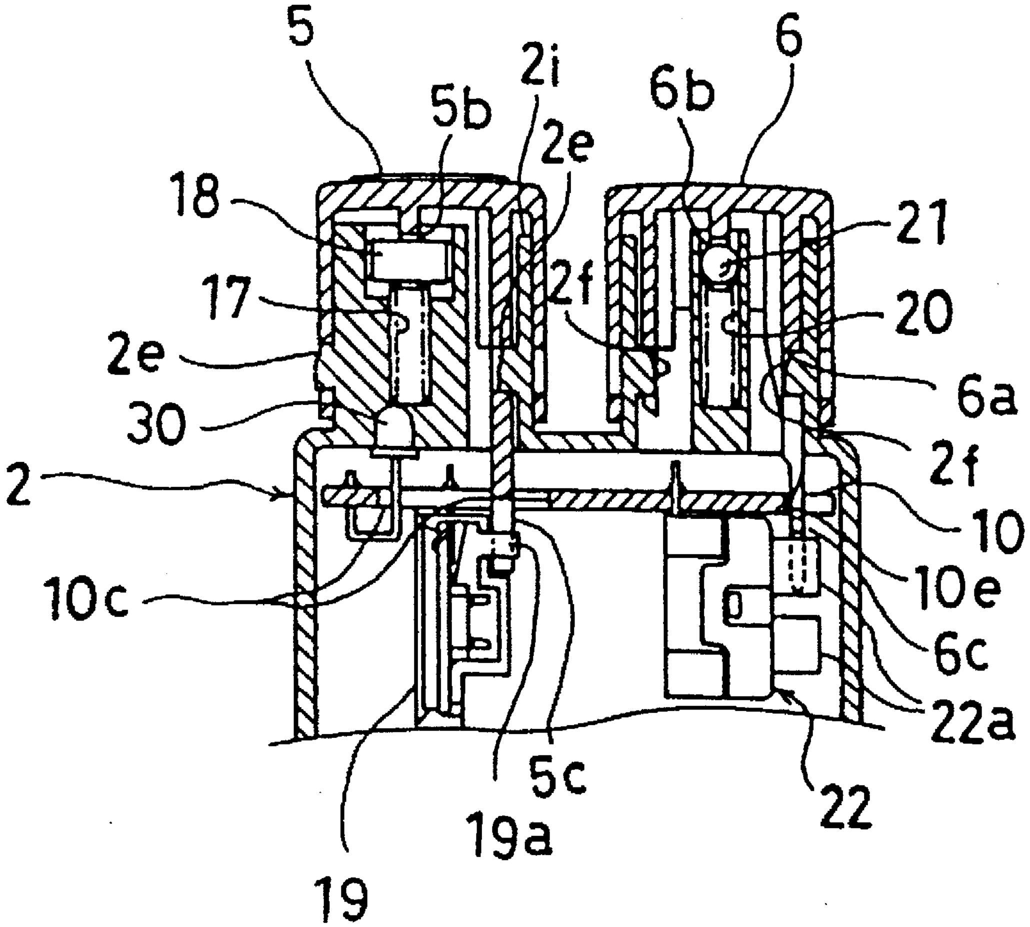
FIG. 5 is a sectional view taken along the line C—C in FIG. 3.

The terminals 29 are formed integrally with the lower case 28 by using an insert molding method. One end of each terminal is projected from the upper surface of the lower case 28. The other end of each terminal is projected into a connector 28*h* of the lower case 28. The light emitting element 30 may be a light emitting diode, a lamp or the like. The light emitting element 30 is disposed above the upper surface of the substrate 10 through the through hole 10*c*. The terminal of the element 30 is bent and extended from the lower surface of the substrate 10 to the upper surface of the substrate 10 through the through hole 10*c* in order to weld its terminal end on the upper surface of the substrate 10, as shown in FIG. 5.

The construction of the present invention, as described above, will become even more apparent from the assembly process described hereinafter with reference to FIGS. 1 to 5.

The lock pin 12 and the plate spring 13 are inserted into the knob 3. The operation rod 3*b* of the knob 3 is inserted into the mounting portion 2*a* through the spring 9 in order to contact the lock pin 12 with the heart-shaped cam 2*c*. The knobs 4, 5, 6, 7 and 8 are pivotally supported on the upper case 2 through the steel balls 15, 21, 24 or the pin 18 and the springs 14, 17, 20, and 23.

The switch contact sections 11, 16, 19, 22, 25, 26 and the electric parts 27 are inserted with pressure into the positioning portions 28*b*, 28*c*, 28*d*, 28*e*, 28*f*, 28*g* and 28*i*, respectively, formed on the upper surface of the lower case 28 integrally with the terminals 29. By this structure, the switch contact sections 11, 16, 19, 22, 25, 26 can be installed at a predetermined position on the lower case 28 with high precision. The terminals 29 and the terminals of the switch contact sections 11, 16, 19, 22, 25, 26, the electric parts 27, and the light emitting element 30 are inserted into the through holes of the substrate 10, respectively, and then welded, respectively.

The substrate 10 is provided with all of the switch contact sections 11, 16, 19, 22, 25, 26, the electric parts 27 and the light emitting element 30 on the lower surface of the substrate 10. Further, these elements are welded on only one side surface of the substrate 10. Therefore, automatic welding using a welding machine may be easily performed. The positioning portions 28*b*, 28*c*, 28*d*, 28*e*, 28*f*, 28*g* and 28*i* mounted on the lower case 28 serve as a jig for holding the switch contact sections 11, 16, 19, 22, 25, 26 and the electric parts 27 when an automatic assembling is performed.

The lower case 28 provides the positioning portions 28*b*, 28*c*, 28*d*, 28*e*, 28*f*, 28*g* and 28*i* and, therefore, any jig for holding the switch contact sections 11, 16, 19, 22, 25, 26 may be unnecessary when an automatic fabrication and an automatic welding are performed. Therefore, the switch contact sections 11, 16, 19, 22, 25, 26 and the like are prevented from being undesirably bent or damaged upon loading or unloading the jig. Further, it becomes possible to reduce the number of assembling processes and the time required for the assembling process.

Moreover, the positioning portions 28*b*, 28*c*, 28*d*, 28*e*, 28*f*, 28*g* and 28*i* prevent the switch contact sections 11, 16, 19, 22, 25, 26, and the electric parts 27 from any shock and vibration being applied to them by holding the switch contact sections 11, 16, 19, 22, 25, 26, and the electric parts 27 welded on the substrate 10. Thus, the switch contact sections 11, 16, 19, 22, 25, 26 can be positioned on the substrate 10 with high precision thereby increasing the quality of the switch body 1 per se.

Moreover, since the switch contact sections 11, 16, 19, 22, 25, 26, the electric parts 27 and the light emitting element 30 are disposed only on one surface side of the substrate 10, and the substrate 10 is disposed in the horizontal direction at the portion adjacent to the inner-top surface of the upper case 2, it becomes possible to reduce the height of the switch assembly 1.

Since the terminals of the switch contact sections 11, 16, 19, 22, 25, 26, the electric parts 27 held or supported by the positioning portions 28*b*, 28*c*, 28*d*, 28*e*, 28*f*, 28*g* and 28*i*, and the terminals 29 mounted on the lower case 28 are welded through the insert molding method, it is unnecessary to fix the substrate 10 to the lower case 28 by using fasteners, such as screws or the like and, therefore, the number of fabrication processes may be reduced.

The fabrication of the switch assembly (body) 1 is completed by contacting the operation rods 3*b*, 4*c*, 5*c*, 6*c*, 7*c* and 8*a* with the operation shafts 11*a*, 16*a*, 19*a*, 22*a*, 25*a*, 26*a*, and coupling the upper case 2 with the lower case 28. The switch assembly (body) 1 has no printed plate nor any intermediate case, except a single substrate 10 located between the upper case 2 and the lower case 28. Therefore, it becomes possible to reduce the number of parts and the number of fabrication processes, thereby presenting a power window switch with low cost.

The present invention thus constructed as mentioned above has the following effects.

(1) Positioning portions for positioning the switch contact sections at predetermined positions, respectively, are provided in the lower case. Thus, the lower case functions as a jig when the switch contact sections are automatically welded with the substrate. The switch contact sections are protected by the positioning portions from any shock and vibration. Further the switch contact sections can be positioned at a correct position with high precision, thereby increasing the operation feeling of the knob.

(2) The substrate of the present invention is disposed in a box composed of the upper and lower cases in the horizontal direction. The switch contact sections are disposed only on the lower surface of the substrate. Therefore, it becomes possible to achieve an automatic welding by using an automatic machine, and thereby reduce the number of assembling processes and the time required for assembling.

(3) According to the present invention, the switch case is reduced in height and the size of the switch assembly is minimized by the structure wherein the substrate is disposed at the portion adjacent to the inner-top surface of the upper case in the horizontal direction, and the substrate is provided with the through hole or the notch portion in which the operation rod of the knob can be inserted.

(4) According to the present invention, the electric parts are disposed only on the lower surface of the substrate. Therefore, all of the electric parts to be mounted on the substrate can be automatically loaded thereon using a machine, and it becomes possible to reduce the number of assembling processes and the time and cost required for assembling the switch assembly.

It will be appreciated that the present invention is not limited to the exact construction which has been described above and which is illustrated in the accompanying drawings, and that various modifications and changes can be made without departing from the scope thereof. It is intended that the scope of the invention only be limited by the appended claims.

I claim:

1. A switch assembly, comprising:

an upper case;

a lower case coupled with said upper case;

a knob pivotally supported on said upper case and having an operation rod extending downwardly from said knob; and a switch contact section having an operation shaft contacted by said operation rod said knob;

wherein said lower case is provided with positioning sections mounted on said lower case for positioning said switch contact section at a predetermined position; and further comprising a substrate mounted in a horizontal direction within a box formed by said upper case and said lower case, said switch contact section being disposed on a lower surface of said substrate.

2. The switch assembly according to claim 1, wherein electric parts are mounted to said substrate only on said lower surface of said substrate.

3. The switch assembly according to claim 1, wherein said substrate is disposed at a position adjacent to an inner-top surface of said upper case in a horizontal direction, and said substrate is provided with through holes or notch portions through which said operation rod is inserted.

4. The switch assembly according to claim 3, wherein electric parts are mounted to said substrate only on said lower surface of said substrate.

5. A switch assembly, comprising:

an upper case;

a lower case coupled with said upper case;

a knob pivotally supported on said upper case and having an operation rod extending downwardly from said knob; and a switch contact section having an operation shaft contacted by said operation rod of said knob;

wherein a substrate is mounted in a horizontal direction within a box formed by said upper case and said lower case, and said switch contact section is disposed on a lower surface of said substrate;

wherein said substrate is disposed at a position adjacent to an inner-top surface of said upper case in a horizontal direction, and said substrate is provided with through holes or notch portions through which said operation rod is inserted; and wherein electric parts are mounted to said substrate only on said lower surface of said substrate.

6. A switch assembly, comprising:

an upper case;

a lower case coupled with said upper case;

a knob pivotally supported on said upper case and having an operation rod extending downwardly from said knob; and a switch contact section having an operation shaft contacted by said operation rod of said knob;

wherein a substrate is mounted in a horizontal direction within a box formed by said upper case and said lower case, and said switch contact section is disposed on a lower surface face of said substrate; and wherein electric parts are mounted to said substrate only on said lower surface of said substrate.

* * * * *